(12) United States Patent
Anderson et al.

(10) Patent No.: US 10,397,109 B2
(45) Date of Patent: Aug. 27, 2019

(54) ROUTING PACKETS IN OVERLAPPING ADDRESS SPACES

(71) Applicant: International Business Machines Corporation, Armonk, NY (US)

(72) Inventors: Eric M. Anderson, Friendswood, TX (US); Susan A. Hearn, Ontario (CA); Linwood E. Loving, Mechanicsville, VA (US); Martin G. Mclaughlin, Glasgow (GB); Daniel R. Miller, Prospect, CT (US); John B. Simmons, Westminster, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/495,315

(22) Filed: Apr. 24, 2017

(65) Prior Publication Data

US 2018/0309670 A1 Oct. 25, 2018

(51) Int. Cl.
*H04L 12/28* (2006.01)
*H04L 12/741* (2013.01)
*H04L 29/06* (2006.01)

(52) U.S. Cl.
CPC ............. *H04L 45/74* (2013.01); *H04L 69/22* (2013.01)

(58) Field of Classification Search
CPC ................................. H04L 45/74; H04L 69/22
See application file for complete search history.

(56) References Cited

U.S. PATENT DOCUMENTS

| 6,811,264 | B2  | 11/2004 | Raskar et al. |
| 7,334,049 | B1* | 2/2008  | Somasundaram ...... H04L 69/22 709/227 |
| 7,453,418 | B2  | 11/2008 | Palmquist |
| 8,294,749 | B2  | 10/2012 | Cable |
| 8,508,471 | B2  | 8/2013  | Suh |
| 9,448,756 | B2  | 9/2016  | Jung et al. |
| 2013/0145008 | A1* | 6/2013 | Kannan ................. H04L 45/586 709/223 |

(Continued)

FOREIGN PATENT DOCUMENTS

WO      2014154118 A1    10/2014

OTHER PUBLICATIONS

Cisco; Using Site-to-Site VPN Translation, 2015.
Amazon; Route Table, 2017.
Appendix P, 2017.

*Primary Examiner* — Clemence S Han
(74) *Attorney, Agent, or Firm* — Garg Law Firm, PLLC; Rakesh Garg; William Hartwell (57) ABSTRACT

At an outbound end of a tunnel from a first data network, a packet is analyzed to determine whether the packet is to be directed to a local target in the first data network or to be sent over the tunnel to a remote target in a second data network. A target address of the packet is present in both the first data network and the second data network. When the packet is to be directed to the remote target in the second data network, an octet in the target address of the packet is changed from a first value to a second value, the changing forming a modified packet. When the second value is stored in the octet, the modified packet is caused to be sent to the tunnel for delivery to the second data network.

19 Claims, 6 Drawing Sheets

(56) References Cited

U.S. PATENT DOCUMENTS

| | | | |
|---|---|---|---|
| 2013/0151032 A1* | 6/2013 | Kraeling | H04L 45/74 701/1 |
| 2013/0287026 A1* | 10/2013 | Davie | H04L 49/70 370/392 |
| 2014/0156470 A1 | 6/2014 | Raman | |
| 2014/0334497 A1* | 11/2014 | Tanimoto | H04L 45/74 370/401 |
| 2016/0080261 A1* | 3/2016 | Koponen | H04L 45/74 370/392 |
| 2016/0155410 A1 | 6/2016 | Nam | |
| 2016/0173376 A1* | 6/2016 | Shichino | H04L 45/74 370/392 |
| 2016/0253044 A1 | 9/2016 | Katz | |
| 2016/0380893 A1* | 12/2016 | Chopra | H04L 45/74 370/392 |

* cited by examiner

ROUTING PACKETS IN OVERLAPPING ADDRESS SPACES

TECHNICAL FIELD

The present invention relates generally to a method, system, and computer program product for correctly routing data packets. More particularly, the present invention relates to a method, system, and computer program product for routing packets in overlapping address spaces.

BACKGROUND

Transmission Control Protocol (TCP) is a commonly used communication protocol used for communicating packet data from one data processing system to another over a data network. Internet Protocol (IP) is an addressing protocol to handle the addressing of the TCP data packets. Together, the layers of the two protocols are implemented as a TCP/IP stack for constructing, sending, and receiving the packets from one data processing system to another data processing system across data networks.

IP version 4 (IPv4) is the fourth version of IP which sets out internet addresses in the form of four octets. An octet is eight bits (each bit capable of representing a binary 0 value or a binary 1 value). The 32-bit IPv4 address takes the form of "A.B.C.D", where A, B, C, and D are each an octet. Each octet is capable of representing 256 Base 10 values, 0-255. The Base 10 value 0 is a reserved value of an octet and usually indicates a group of other Base 10 numbers of a subnet that are permissible in that octet. A subnet is a part of a network in which at least one octet of the addressing is common with other parts of the network, and a differing octet takes on different values within the part.

Hereinafter, a reference to a first octet is a reference to the "A" octet in the above IPv4 representation. Similarly, a reference to a second octet is a reference to the "B" octet, a reference to a third octet is a reference to the "C" octet, and a reference to a fourth octet is a reference to the "D" octet in the above IPv4 representation. For example, in an example IP address 192.168.1.2, the first octet has the value 192 in Base 10, the second octet has the value 168 in Base 10, the third octet has the value 1 in Base 10, and the forth octet has the value 2 in Base 10. Hereinafter, unless an octet is represented in binary, or unless expressly distinguished where used, a value of an octet refers to a Base 10 value represented in the octet.

Some IPv4 address spaces are reserved for internal use within a local area network (LAN). For example, 192.0.0.0 and 10.0.0.0 are two address spaces which are supposed to be configured for uniqueness within only a LAN, and are not supposed to be unique across Wide Area Networks (WAN). Internet Engineering Task Force (IETF) document 'Request for Comments-1918' (RFC-1918) identifies that the following IPV4 address ranges have been reserved by Internet Assigned Numbers Authority (IRNA) for private Internets: 10.0.0.0/8, 172.16.0.0/12, and 192.168.0.0/16. Therefore, as an example, two different LANs can each implement 10.x.y.z address, e.g., 10.2.3.4, such that 10.2.3.4 will be uniquely associated with a network interface of a target system or application, the uniqueness being valid only with each respective LAN.

SUMMARY

The illustrative embodiments provide a method, system, and computer program product. An embodiment includes a method that analyzes, at an outbound end of a tunnel from a first data network, a packet to determine whether the packet is to be directed to a local target in the first data network or to be sent over the tunnel to a remote target in a second data network, wherein a target address of the packet is present in both the first data network and the second data network. The embodiment changes, responsive to the packet being directed to the remote target in the second data network, an octet in the target address of the packet from a first value to a second value, the changing forming a modified packet. The embodiment causes, responsive to storing the second value of the octet, the modified packet to be sent to the tunnel for delivery to the second data network.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

An application or system that sends a packet is hereinafter referred to as a "source" system, or simply a "source". A LAN within which the source system operates is hereinafter referred to as a "local" network. An application or system that receives a packet is hereinafter referred to as a "target" system, or simply a "target". A LAN within which the target system operates is hereinafter referred to as a "remote" network.

A reference to a "network" is a reference to a physical LAN or a virtual LAN unless specifically distinguished where used. A "gateway" is a suitable type of system that routes packets originating from a source within a network, arriving for a target inside the network, or both. Generally, a gateway can be implemented using one or more routers, one or more firewalls, or a combination of similarly functioning networking components. In the illustrative embodiments, the gateway is a physical or virtual device that is operating as a virtual private network (VPN) endpoint, which sends outbound packets from a source to a VPN for delivery to a target on the remote end of the VPN.

A source within one network (local-1 network) often has to send a data packet to a target in another network. Sometimes the other network (local-2 network) is also on the same side of the gateway as the local-1 network in which the source is operating. At other times, the other network (remote-1 network) may be on the opposite side of the gateway from the local-1 network of the source. The illustrative embodiments recognize that in some cases, the local-2 network and the remote-1 network may both have implemented IPv4 addressing that overlaps for at least some addresses. For example, the local-2 network may have implemented a 10.55.104.10 address and the remote-1 network may also have implemented a 10.55.104.10 address.

When a source in local-1 network sends a packet to 10.55.104.10 address, a confusion arises as to whether the packet should go to the 10.55.104.10 target in local-2 network or the 10.55.104.10 target in remote-1 network. A gateway receiving the packet from local-1 network may misroute the packet to local-2 target when the packet was supposed to go to remote-1 target and vice-versa, or drop the packet. Both such situations are problematic and a solution is needed to allow the gateway to correctly route the packet to the packet's intended destination.

The illustrative embodiments recognize that the presently available tools or solutions do not address these needs/problems or provide adequate solutions for these needs/problems. The illustrative embodiments used to describe the invention generally address and solve the above-described problems and other related problems by routing packets in overlapping address spaces.

An embodiment can be implemented as a software application. The application implementing an embodiment, or one or more components thereof, can be configured as a modification of an existing gateway—i.e., a native application in the gateway, as an application executing in a data processing system—such as a central cloud controller device—communicating with an existing gateway over a local area network (LAN)—i.e., a local application on the LAN, as an application executing in a data processing system communicating with an existing gateway over a wide area network (WAN)—i.e., a remote application on the WAN, as a separate application that operates in conjunction with an existing gateway in other ways, a standalone application, or some combination thereof.

An embodiment operates to process an outbound packet. The embodiment operates in conjunction with a gateway that can route a packet from a source in a local network (local-1) to a VPN for a target in a remote network on the other end of the VPN, and route a packet from the source in local-1 to a target in another local network (local-2) which is on the same side of the gateway.

The embodiment detects an outbound packet from a source in local-1 network. The embodiment determines whether the target address in the packet is in a sub-domain of the remote network. When the target address in the packet is an address in the remote network, the embodiment swaps an octet—i.e. changes an existing value of the octet—in the target address with a new value of the octet.

The determination whether a target address is in a remote network is governed by a set of address records. An address record is configured to inform the gateway whether a subnet is on the local side of the gateway or the remote side of the gateway.

For example, when the source cannot be modified, an address record uses a port number to distinguish between a subnet on the local side and a subnet on the remote side of the gateway. For example, in one example address record, if the source sends the packet to 10.55.104.10:222, where 222 is a port number, the address 10.55.104.10 is deemed to be on the remote side whereas if the source sends the packet to 10.55.104.10:80, where 80 is a port number, the address 10.55.104.10 is deemed to be on the local side. Any number of address records can similarly be configured for port-number based distinguishing method according to the illustrative embodiments.

As another example, when the source can be modified, the source can be programmed to use different source identifiers, e.g., different source IP addresses when sending to a target address in an overlapping address space. In such a case, an address record uses a source identifier to distinguish between a subnet on the local side and a subnet on the remote side of the gateway. For example, in one example address record, if the source sends the packet to 10.55.104.10 using a source identifier 10.2.1.1, where 10.2.1.1 is a source address, the address 10.55.104.10 is deemed to be on the remote side, whereas if the source sends the packet to 10.55.104.10 using a source identifier 10.2.1.2, where 10.2.1.2 is a different source address for the same source, the address 10.55.104.10 is deemed to be on the local side.

Any other identifier can be used instead of a source address in this manner so long as the source identifier can be carried in the packet and is readable by the gateway. Any number of address records can similarly be configured for source identifier based distinguishing method according to the illustrative embodiments.

The swap of an octet—i.e., changing the octet value from one value to another—in a target address is governed by a set of swapping rules. A swapping rule provides the gateway a replacement or swap value if the gateway finds a particular value in an octet of the target address in a packet.

In one embodiment, a single rule can be configured to determine whether a subnet of the target address is in a remote network, and the replacement octet value to use, if so.

For example, the target address may be 10.2.15.34 in the packet arriving from the source. An address record might provide that 10.2.0.0 subnet is in a remote network. Accordingly, a swapping rule might provide that the first octet should be replaced with a value 2. Using the address record and the swapping rule, the gateway changes the target address from 10.2.15.34 to 2.2.15.34.

The modified target address formed as a result of the swapping now allows the packet to be routed to a path that leads from the gateway to the VPN. This routing of the packet with the modified target address is performed using the presently available routing methods, e.g., using a routing table.

If the target address in the packet is not in a subnet on a remote network, then the embodiment causes no swapping of the octet. Accordingly, the gateway causes the packet to be routed to the same side of the gateway as the local-1 network, e.g., by sending the packet to a backend router that facilitates communication between various local networks such as between local-1 network and local-2 network.

When the packet reaches the backend router, the backend router delivers the packet to the target in the local-2 network. Thus, the packet is correctly routed to a target in a local network on the same side of the gateway or on a remote network the opposite side of the gateway from the source even though the local network and the remote network might have overlapping address spaces.

Another embodiment operates to process an inbound packet. The embodiment operates in conjunction with a gateway that can route a received packet to a target in the remote network. For example, such an embodiment operates to allow a gateway operating in conjunction with the remote network to receive the packet that was transmitted over the VPN with the modified target address described earlier.

The embodiment determines that a received packet has a swapped octet. The embodiment makes this determination using a swap-back rule. A swap-back rule is configured to change a value of an octet in the target address of a received packet from the value contained in the octet in the received packet to an octet value that was originally configured by the source of the received packet.

For example, suppose that the modified target address in the received packet is 2.2.15.34 for the reasons described above. A swap-back rule determines that if the first octet has a value "2", the value of that octet should be changed to "10". Accordingly, the swap-back rule causes the receiving gateway to change the target address from 2.2.15.34 back to 10.2.15.34. the receiving gateway can now route the modified received packet to the intended target in the remote network. The routing to the target inside the remote network can be accomplished using existing routing methods, such as a routing table.

In another embodiment, the octet swapping functions and the octet swap-back functions are implemented together. Such a combined implementation allows for the correct routing of packets in both directions of the data traffic when overlapping address spaces exist on both sides of a VPN.

The manner of routing packets in overlapping address spaces described herein is unavailable in the presently available methods. A method of an embodiment described herein, when implemented to execute on a device or data processing system, comprises substantial advancement of the functionality of that device or data processing system in correctly routing packets when the packet address has an octet that is used by at least one network on the local side of the gateway and at least one network on the remote side of the gateway.

The illustrative embodiments are described with respect to certain types of addresses, subnets, octet values, records, rules, gateways, networks, sources, targets, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
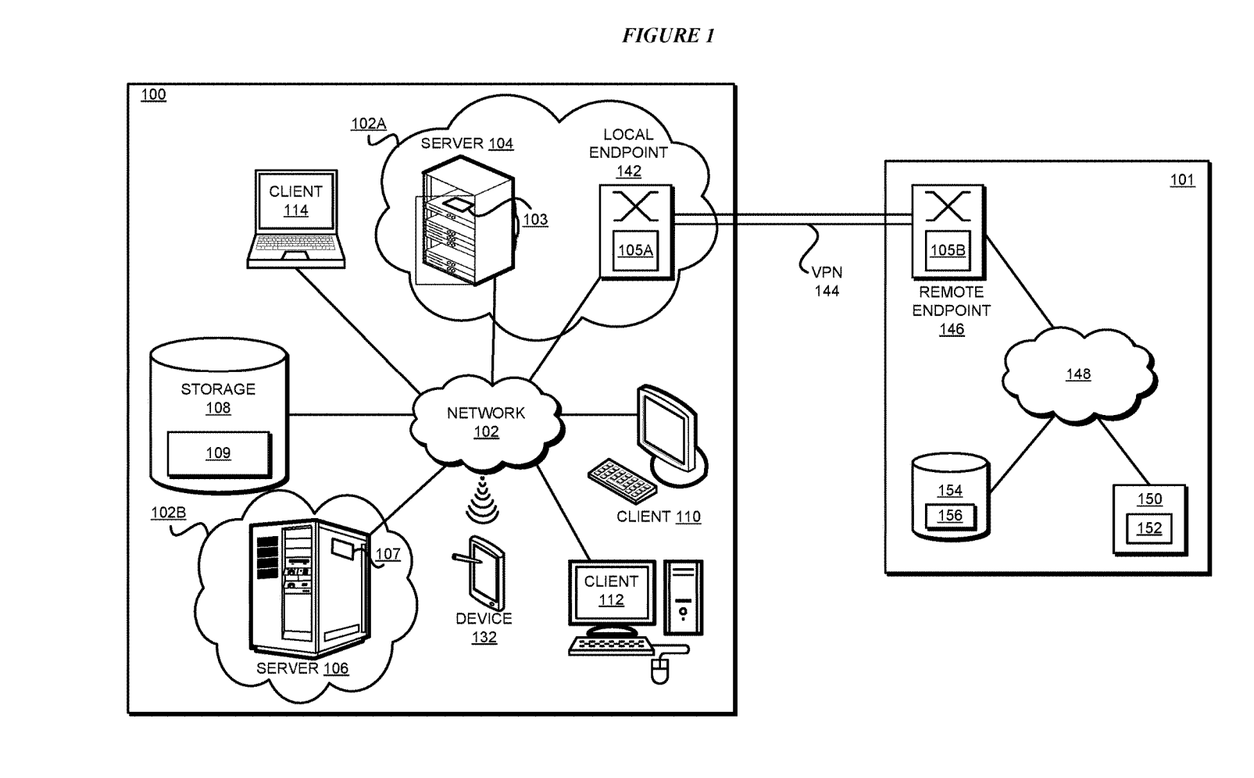
FIG. 1 depicts a block diagram of a network of data processing systems in which illustrative embodiments may be implemented.
Figure 2:
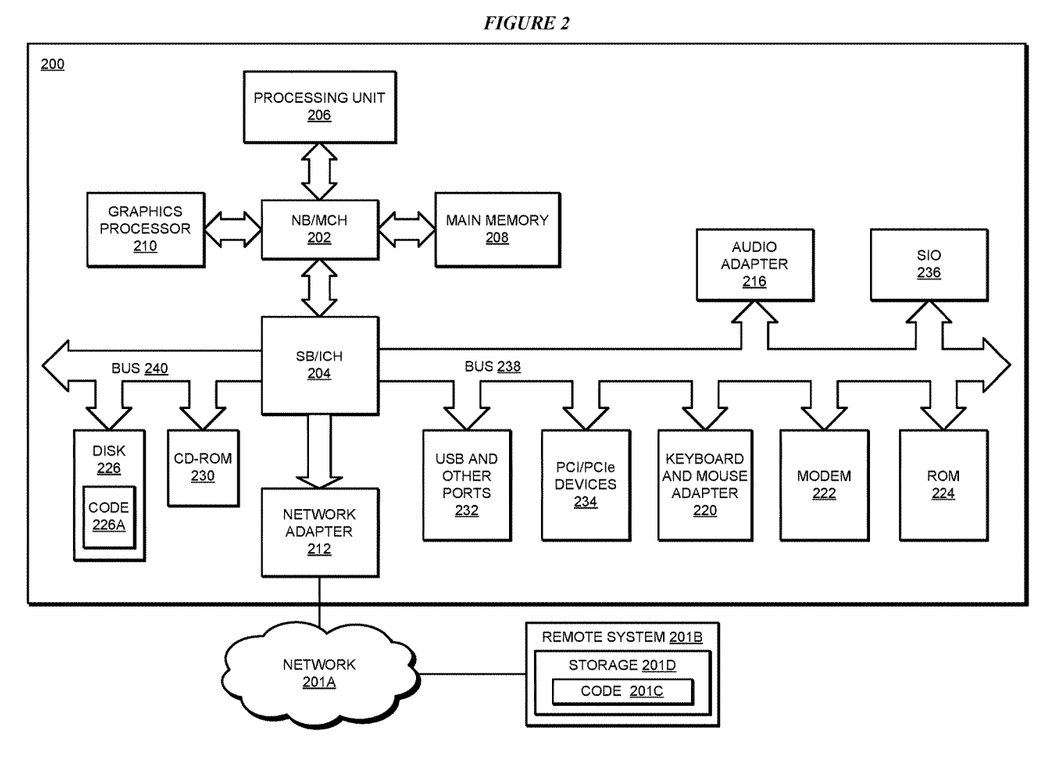
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be Implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105A implements an embodiment described herein. Application 105B implements another embodiment described herein. As an example, assume that within environment 100, application 103 is a source that exists in a local-1 network 102A and application 107 is a local target exists in a local-2 network 102B. As an example, networks 102A and 102B may be different virtual LANs within environment 100 and communication between networks 102A and 102B is enabled by a backend router (not shown). Source 103 sends packets out of local-1 network 102A via a local endpoint 142. Local endpoint 142 can be implemented using a gateway as described herein. Application 105A need not necessarily be implemented within local endpoint 142 but may operate in conjunction therewith in any suitable manner as described herein.

Repository 108 stores data 109. Data 109 comprises a set of address records (for port-based distinction or source id based distinction, or both), and a set of swapping rules. Local endpoint 142 with the functionality imparted by application 105A uses data 109 to route a packet from source 103 correctly in a manner described herein. Data 109 in repository 108 may also include a set of swap-back rules for use when local endpoint 142 receives a packet in which an octet has been swapped.

Within environment 101, application 152 is a remote target in remote network 148. Further assume that local-2 network in environment 100 and remote network 148 have an overlap in their address-spaces in at least one octet. Target 152 in system 150 on remote network 148 receives data packets over VPN 144 via remote endpoint 146. Remote endpoint 146 can be implemented using a gateway as described herein. Application 105B need not necessarily be implemented within remote endpoint 146 but may operate in conjunction therewith in any suitable manner as described herein.

Repository 154 stores data 156. Data 156 comprises a set of swap-back rules for use when local endpoint 146 receives a packet in which an octet has been swapped as described herein. Remote endpoint 146 with the functionality imparted by application 105B uses data 156 to route a packet to target 152 correctly in a manner described herein. Data 156 in repository 154 may also include a set of address records (for port-based distinction or source id based distinction, or both), and a set of swapping rules for use when application 152 has to send a packet to one of the targets in one of the networks that have an address space overlap.

Servers 104 and 106, storage unit 108, and clients 110, 112, and 114, and device 132 may couple to network 102 using wired connections, wireless communication protocols, or other suitable data connectivity. Clients 110, 112 and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105A and 105B in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
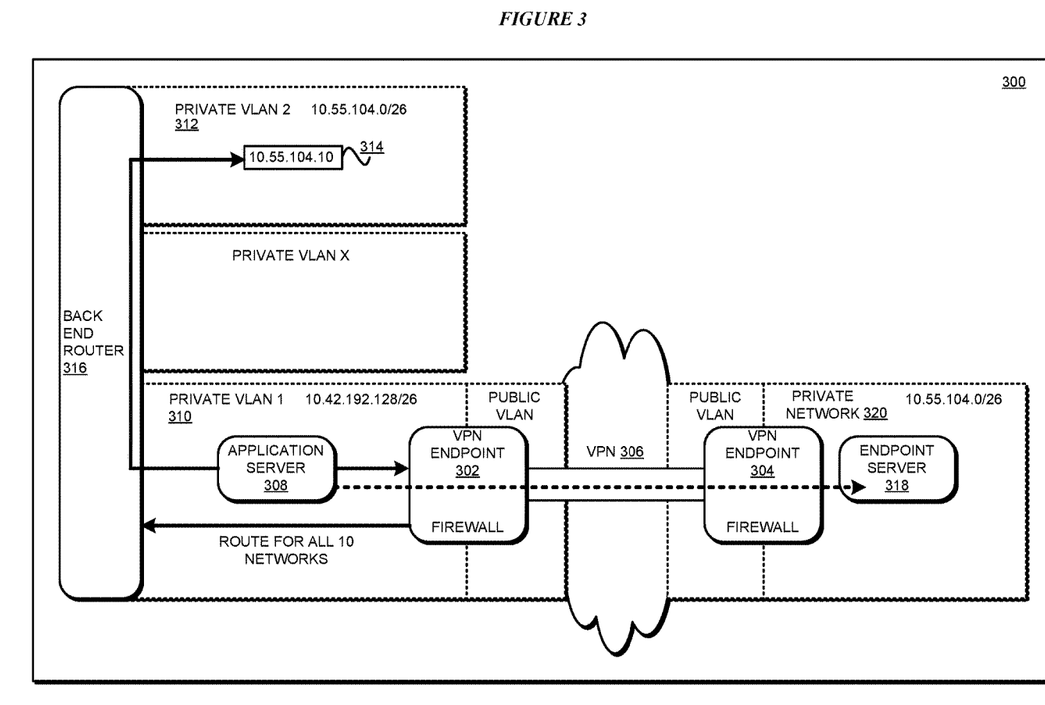
FIG. 3 depicts a block diagram of an example configuration for routing packets in overlapping address spaces in accordance with an illustrative embodiment.

With reference to FIG. 3, this figure depicts a block diagram of an example configuration for routing packets in overlapping address spaces in accordance with an illustrative embodiment. Endpoint 302 in configuration 300 is an example of local endpoint 142 in FIG. 1 and has been enabled by the functionality of application 105A in a manner described herein. Endpoint 304 is an example of remote endpoint 146 in FIG. 1 and has been enabled by the functionality of application 105B in a manner described herein. VPN 306 provides a path for data packets to travel from endpoint 302 to endpoint 304.

Application server 308 is an example of source 103. Source 308 operates in private VLAN 1, which will be referred to a local-1 310. Local-1 310 has, for example an address space of 26 addresses starting from 10.42.192.128. many other private VLANs might exist on the same side as local-1 310, as shown. Suppose that private VLAN 2, referred to as local-2 312 has a local target 314 operating therein. Local-2 312 has, for example an address space of 26 addresses in subnet 10.55.104.0, and local target 314 has the IP address 10.55.104.10. backend router 316 facilitates communication between local-1 310, local-2 312, and possibly other local side networks.

Endpoint server 318 is an example of remote target 152. Remote target 318 operates in a private network, which will be referred to a remote network 320. Remote network 320 has, for example an address space of 26 addresses in subnet 10.55.104.0, and remote target 318 has the IP address 10.55.104.10.

In an example problematic operation that improved endpoints 302 and 304 solve as described herein, source 308 sends a packet with a target address 10.55.104.10. endpoint 302 resolves whether the packet should reach local target 314 or remote target 318 by using an address record (or port-based differentiation type or source id based differentiation type). If the packet should reach local target 314, endpoint 302 routes the packet to backend router 316, which routes the packet to local target 314 in local-2 312.

If the packet should reach remote target 318, endpoint 302 swaps an octet using a swapping rule. When the packet with the swapped octet reaches endpoint 304, endpoint 304 uses a swap-back rule to change the octet back to the original value and routing the packet to remote target 318 in remote network 320.

Figure 4:
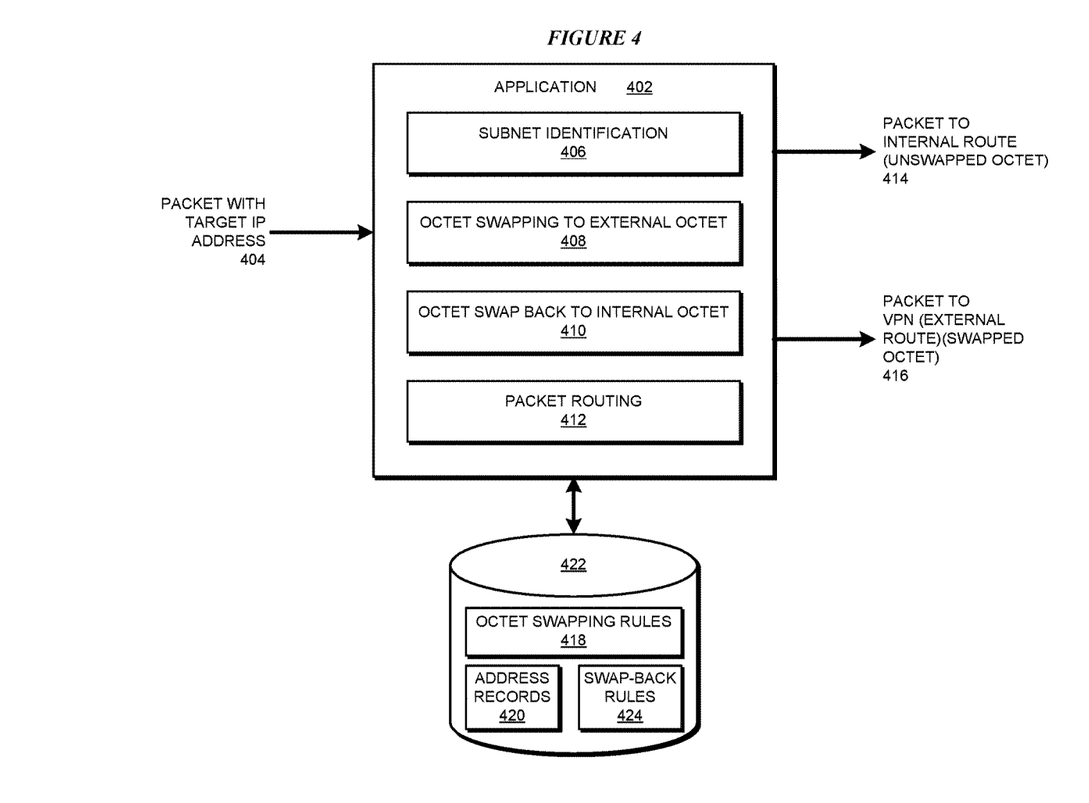
FIG. 4 depicts a block diagram of an application for routing packets in overlapping address spaces in accordance with an illustrative embodiment.

With reference to FIG. 4, this figure depicts a block diagram of an application for routing packets in overlapping address spaces in accordance with an illustrative embodiment. Application 402 can be completely or partially implemented at each endpoint of a VPN to impart a selected functionality of an embodiment to each endpoint. For example, in one installation, application 402 can be implemented as a whole to form improved endpoint 302; and application 402 can be implemented as a whole to form improved endpoint 304. Alternatively, in another installation, only components 406, 408, and 412 can be implemented to form improved endpoint 302; and only components 410 and 412 can be implemented to form improved endpoint 304.

When application 402 is implemented on the outbound side of a VPN, input 404 to application 402 comprises an outbound packet having a target IP address. When packet 404 has a target IP address that is available in a local-side network as well as a remote-side network, component 406 performs subnet identification using repository 422 operating on the outbound side of the VPN. Particularly, component 406 uses an address records 420 in repository 422— which may be of the port distinction type, source id distinction type, or a combination thereof) to decide whether the target IP's subnet is located on the local-side or the remote side of the endpoint where packet 404 is received.

If component 406 determines that packet 404 is directed to a target in a local-side network, component 412 routes unchanged packet 404 via a backend router, such as backend router 316 in FIG. 3. Packet 414 is an unchanged version of packet 404.

If component 406 determines that packet 404 is directed to a target in a remote-side network, component 408 extracts or selects a suitable swapping rule 418 from repository 422. Component 408 applies selected swapping rule 418 to packet 404 and modifies an octet in the target address of packet 404.

Component 412 routes the modified version of packet 404—where an octet of the target address has been swapped—via a VPN, such as VPN 306 in FIG. 3. Packet 416 is the modified version of packet 404.

When application 402 is implemented on the inbound side of a VPN, input 404 to application 402 comprises an inbound packet having a target IP address. Component 410 determines whether a swap-back rule 424 in repository 422 (repository 422 now operating on the inbound side of the VPN) applies to the target address of packet 404. For example, a swap-back rule applies if the target address has a swapped octet.

If a swap-back rule 424 applies, component 410 causes a swap-back, i.e., reversion or overwriting of the swapped octet to the value of the octet that would be needed for routing the packet in the network on the inbound side of the VPN. Component 412 then routes the packet with the swapped-back target address to the destination.

Figure 5:
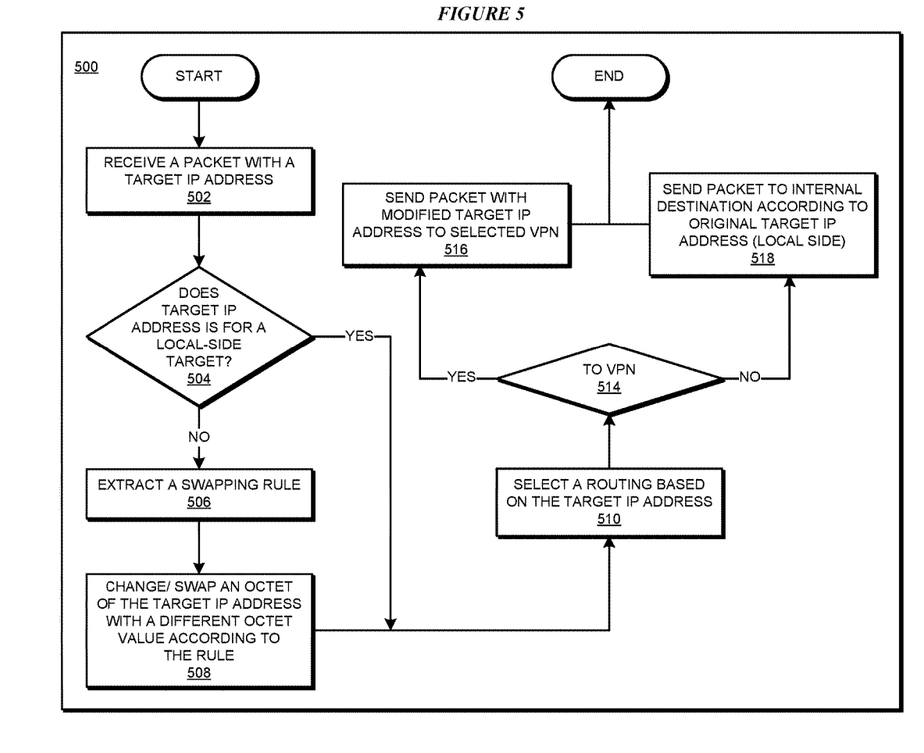
FIG. 5 depicts a flowchart of an example process in routing packets in overlapping address spaces in accordance with an illustrative embodiment.

With reference to FIG. 5, this figure depicts a flowchart of an example process in routing packets in overlapping address spaces in accordance with an illustrative embodiment. Process 500 can be implemented in application 402 in FIG. 4, such as when application 402 is used on the outbound side of the VPN.

The application receives a packet that has a target address (block 502). The application determines whether the target address is for a local-side target (block 504). For example, the determination of block 504 uses an address record in a manner described herein.

If the target address is not for a local-side target ("No" path of block 504), the application extracts a swapping rule corresponding to an aspect of the packet—e.g., a target port number, a source identifier, or both (block 506). The application changes or swaps an octet value in the target address with a different octet value according to the extracted swapping rule (block 508). The application then routes the packet with the (modified) target address (block 510).

If the target address is for a local-side target ("Yes" path of block 504), the application proceeds to block 510. The application routes the packet according to the unchanged target address at block 510.

In order to route the packet, the application determines whether the target address is one that is to be routed using a VPN to a remote network (block 514). If the packet has to be routed to a VPN, e.g., when the target address has a swapped octet ("Yes" path of block 514), the application sends the packet to the VPN selected according to the modified target address (block 516). If the packet does not have to be routed to a VPN, e.g., when the target address is unchanged ("No" path of block 514), the application sends the packet to the local-side network, e.g., via a backend router (block 518). The application ends process 500 thereafter.

Figure 6:
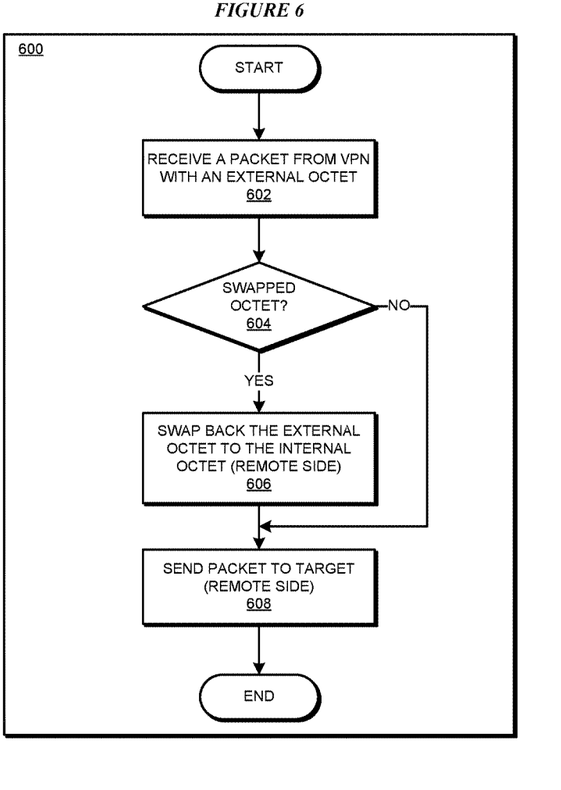
FIG. 6 depicts a flowchart of another process in routing packets in overlapping address spaces in accordance with an illustrative embodiment.

With reference to FIG. 6, this figure depicts a flowchart of another process in routing packets in overlapping address spaces in accordance with an illustrative embodiment. Process 600 can be implemented in application 402 in FIG. 4, such as when application 402 is used on the inbound side of the VPN.

The application receives an inbound packet (block 602). The application determines whether the packet has a swapped octet in the target address, e.g., by determining whether the target address satisfies any of the swap-back rules (block 604). If a swapped octet exists ("Yes" path of block 604), the application swaps back the octet to a value, e.g., a value according to the matching swap-back rule, which allows the packet to be routed to the intended target (block 606). The application sends the packet with the swapped back octet to the destination (block 608). The application ends process 600 thereafter.

If a swapped octet does not exist in the packet ("No" path of block 604), the application sends the unmodified inbound packet to the destination (block 608). The application ends process 600 thereafter.

Thus, a computer implemented method, system or apparatus, and computer program product are provided in the illustrative embodiments for routing packets in overlapping address spaces and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    analyzing, at an outbound end of a tunnel from a first data network, a first packet to determine whether the first packet is to be directed to a local target in the first data network or to be sent over the tunnel to a remote target in a second data network, wherein a target address of the first packet is present in both the first data network and the second data network;
    changing, responsive to the first packet being directed to the remote target in the second data network, an octet in the target address of the first packet from a first value to a second value, the changing forming a first modified packet;
    causing, responsive to storing the second value of the octet, the first modified packet to be sent to the tunnel for delivery to the second data network;
    determining a port number associated with the target address;
    determining, using an address record, that the port number is used in the second data network; and
    concluding that the first packet is directed to the remote target in the second data network.

2. The method of claim 1, further comprising:
    causing a second packet to be received at an inbound end of the tunnel at the second data network;
    causing a determination at the inbound end whether the second packet has the second value in the octet in the target address;
    modifying, responsive to the target address having the second value in the octet, the second value to a third value, wherein the third value is suitable for routing the second packet to the remote target in the second data network, the modifying forming a modified second packet; and
    routing the modified second packet to the remote target in the second data network.

3. The method of claim 2, wherein a target address in the second packet is the target address in the first modified packet.

4. The method of claim 2, wherein a target address in the modified second packet is the target address in the first packet.

5. The method of claim 1, further comprising:
    routing, responsive to the first packet being directed to the local target in the first data network, the first packet to the first data network, wherein a sender of the first packet is on a third data network, and wherein first data network and the third data network are both on the outbound end of the tunnel.

6. The method of claim 1, further comprising:
    selecting the tunnel from a plurality of tunnels, wherein the tunnel corresponds to the second value of the octet.

7. The method of claim 1, wherein the first data network is configured with a first set of internet protocol version 4 (IPv4) addresses and the second data network is configured with a second set of IPv4 addresses, and wherein the first set of IPv4 addresses and the second set of IPv4 addresses have at least one subset of addresses that are same in the first and the second sets, and wherein the target address is a member of the at least one subset of addresses.

8. The method of claim 1, further comprising:
    determining a source identifier associated with a sender of the first packet, wherein the sender uses a first source identifier for sending packets to the local target and a second source identifier for sending packets to the remote target; and
    concluding, responsive to determining by using an address record that the source identifier is the second source identifier, that the first packet is directed to the remote target in the second data network.

9. The method of claim 8, wherein the source identifier is an IP address of the sender, and wherein the first source identifier is a first IP address associated with the sender and the second source identifier is a second IP address associated with the sender.

10. The method of claim 1, wherein the target address is an IPv4 target address, and wherein the octet is a first octet in the IPv4 target address.

11. A computer usable program product comprising one or more computer-readable storage devices, and program instructions stored on at least one of the one or more storage devices, the stored program instructions comprising:
    program instructions to analyze, at an outbound end of a tunnel from a first data network, a first packet to determine whether the first packet is to be directed to a local target in the first data network or to be sent over the tunnel to a remote target in a second data network, wherein a target address of the first packet is present in both the first data network and the second data network;
    program instructions to change, responsive to the first packet being directed to the remote target in the second data network, an octet in the target address of the first packet from a first value to a second value, the changing forming a first modified packet;
    program instructions to cause, responsive to storing the second value of the octet, the first modified packet to be sent to the tunnel for delivery to the second data network;
    program instructions to determine a port number associated with the target address;
    program instructions to determine, using an address record, that the port number is used in the second data network; and
    program instructions to conclude that the first packet is directed to the remote target in the second data network.

12. The computer usable program product of claim 11, further comprising:
    program instructions to cause a second packet to be received at an inbound end of the tunnel at the second data network;
    program instructions to cause a determination at the inbound end whether the second packet has the second value in the octet in the target address;

program instructions to modify, responsive to the target address having the second value in the octet, the second value to a third value, wherein the third value is suitable for routing the second packet to the remote target in the second data network, the modifying forming a modified second packet; and program instructions to route the modified second packet to the remote target in the second data network.

13. The computer usable program product of claim 12, wherein a target address in the second packet is the target address in the first modified packet.

14. The computer usable program product of claim 12, wherein a target address in the modified second packet is the target address in the first packet.

15. The computer usable program product of claim 11, further comprising:

program instructions to route, responsive to the first packet being directed to the local target in the first data network, the first packet to the first data network, wherein a sender of the first packet is on a third data network, and wherein first data network and the third data network are both on the outbound end of the tunnel.

16. The computer usable program product of claim 11, further comprising:

program instructions to select the tunnel from a plurality of tunnels, wherein the tunnel corresponds to the second value of the octet.

17. The computer usable program product of claim 11, wherein the computer usable code is stored in a computer readable storage device in a data processing system, and wherein the computer usable code is transferred over a network from a remote data processing system.

18. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze, at an outbound end of a tunnel from a first data network, a packet to determine whether the packet is to be directed to a local target in the first data network or to be sent over the tunnel to a remote target in a second data network, wherein a target address of the packet is present in both the first data network and the second data network;

program instructions to change, responsive to the packet being directed to the remote target in the second data network, an octet in the target address of the packet from a first value to a second value, the changing forming a modified packet;

program instructions to cause, responsive to storing the second value of the octet, the modified packet to be sent to the tunnel for delivery to the second data network;

program instructions to determine a port number associated with the target address;

program instructions to determine, using an address record, that the port number is used in the second data network; and program instructions to conclude that the packet is directed to the remote target in the second data network.

* * * * *

UNITED STATES PATENT AND TRADEMARK OFFICE
CERTIFICATE OF CORRECTION

PATENT NO. : 10,397,109 B2  
APPLICATION NO. : 15/495315  
DATED : August 27, 2019  
INVENTOR(S) : Eric M. Anderson et al.

Page 1 of 1

It is certified that error appears in the above-identified patent and that said Letters Patent is hereby corrected as shown below:

On the Title Page (72) Inventors at Line 7, after (US): Please add Joseph V. Boyle, Bayville, NJ (US).

Signed and Sealed this
Tenth Day of March, 2020

Andrei Iancu
*Director of the United States Patent and Trademark Office*